United States Patent
Jesberger et al.

(10) Patent No.: US 8,013,043 B2
(45) Date of Patent: Sep. 6, 2011

(54) HAZY POLYESTER FILM WITH IMPROVED TECHNOLOGY

(75) Inventors: Martin Jesberger, Mainz (DE); Silke Richter, Wiesbaden (DE); Thomas Vogel, Oberasbach (DE); Hans Mahl, Laufenselden (DE); Gisbert Bammert, Oestrich-Winkel (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 60 days.

(21) Appl. No.: 12/558,695

(22) Filed: Sep. 14, 2009

(65) Prior Publication Data
US 2010/0068493 A1 Mar. 18, 2010

(30) Foreign Application Priority Data
Sep. 18, 2008 (DE) .................. 10 2008 047 683

(51) Int. Cl.
 *C08G 64/00* (2006.01)
 *C08G 63/02* (2006.01)
(52) U.S. Cl. ............... 524/80; 264/210.1; 264/210.7; 428/220
(58) Field of Classification Search ........... 264/210.1, 264/210.7; 428/220; 524/80
See application file for complete search history.

(56) References Cited

U.S. PATENT DOCUMENTS

| 4,780,402 A | 10/1988 | Remmington |
| 6,440,532 B1 * | 8/2002 | Ogawa et al. ............... 428/141 |
| 6,935,350 B2 * | 8/2005 | Nakamura ............... 132/144 |

FOREIGN PATENT DOCUMENTS

| EP | 1 125 966 A1 | 8/2001 |
| EP | 1 125 967 A1 | 8/2001 |
| EP | 1 842 663 A1 | 10/2007 |

OTHER PUBLICATIONS

Kunststoff-Journal, No. 10, (1974) p. 30-36.
Kunststoff-Journal, No. 11, (1974) p. 26-31.

* cited by examiner

*Primary Examiner* — Terressa Boykin
(74) *Attorney, Agent, or Firm* — ProPat, L.L.C.

(57) ABSTRACT

A hazy polyester film with a thickness in the range from 10 to 100 μm including thermoplastic polyester as the main constituent and barium sulfate with a particle size in the range from 0.1 to 0.5 μm, expressed as $d_{50}$, in an amount in the range from 5 to 25% by weight. The films exhibit a transparency, measured to ASTM-D 1003, of greater than 56% and a haze in the range from 40 to 95%. Owing to their particular optical properties in the form of high transparency with simultaneous scattering action in the form of volume scatter, the film is suitable particularly for use for internal and external window glazing, for interior paneling in bright rooms, for exhibition construction, in vehicles and buildings, in the lighting sector and in shopfitting and shelving.

23 Claims, 1 Drawing Sheet

HAZY POLYESTER FILM WITH IMPROVED TECHNOLOGY

CROSS-REFERENCE TO RELATED APPLICATIONS

This application claims priority to German Patent Application 10 2008 047 683.8 filed Sep. 18, 2009 which is hereby incorporated herein by reference in its entirety.

FIELD OF THE INVENTION

The invention relates to a hazy film composed of a thermoplastic polyester with improved transparency, whose thickness is in the range from 10 to 100 µm. The film comprises at least one pigment with a particle size in the cryptocrystalline range and optionally a UV stabilizer as a light stabilizer, and it may additionally also comprise a soluble flame retardant and an optical brightener. The film is notable for good stretchability and good mechanical and optical properties. The invention further relates to a process for producing this film and to the use thereof.

BACKGROUND OF THE INVENTION

White opaque films with thicknesses in the range between 10 and 100 µm are well known. U.S. Pat. No. 4,780,402 describes a light-sensitive imaging material comprising an opaque carrier film of polyester which has a high proportion of barium sulfate in the range from 5 to 50% by weight. The particle size of the barium sulfate used according to the teaching of the US patent is in the range from 0.5 to 10 µm.

EP 1 125 967 (whose United States equivalent is published as United States Published Application No. 2003/017317) relates to a white opaque film with low transparency composed of a crystallizable thermoplastic whose thickness is in the range from 10 to 500 µm. The film contains 0.2 to 40% by weight of barium sulfate with a mean particle size in the range from 0.1 to 5 µm as a white pigment, and also an optical brightener, and is notable for good stretchability, for low transparency, and for very good optical and mechanical properties. The barium sulfate and/or the optical brightener are either incorporated directly into the thermoplastic at the raw material manufacturer, or metered in as a masterbatch in the course of film production. Owing to its combination of properties, the film is suitable for comparable applications as described above in EP 1 125 966. However, for the desired translucence, the transparency of the film is unsuitable for specific applications in the exterior sector such as exterior glazing.

EP 1 842 663 (whose United States equivalent is published as United States Published Application No. 2007/240075) describes a white opaque coextruded film which, as well as white pigments, comprises at least one antiblocking agent in the outer layers for better windability. However, the transparency of this film is very low, similarly to the case of EP 1 125 967. Owing to its low transparency, this prior art film cannot be used for glazing either, and especially not in the exterior sector.

SUMMARY OF ADVANTAGEOUS EMBODIMENTS OF THE INVENTION

It was an object of the present invention to provide a hazy polyester film with a thickness of 10 to 100 µm, which, as well as its exceptional optical properties, exhibits high transparency in conjunction with high light scatter, good stretchability corresponding to the prior art and good mechanical properties.

According to the application, the term "transparency" shall be understood to mean a good transparency for visible light, in the case of which, however, volume scatter of the transmitted light takes place at the same time.

A high UV stability means that the films are damaged only to an extremely minor degree, if at all, by sunlight or other UV radiation, such that the films are suitable for exterior applications and/or critical interior applications. More particularly, the films should not yellow in the course of external use over a period of years, they should not exhibit any embrittlement or crack formation of the surface, and they should also not have any deterioration in the mechanical properties. High UV stability accordingly means that the film absorbs the UV light and transmits light only in the visible region.

The good optical properties include, for example, homogeneous, streak-free coloring over the entire film length and film width, a high transparency (greater than 56%) and high volume scatter, expressed as the haze in the range from 40 to 95%, a low surface gloss (less than 30, measured at 20°), and a low yellowness index which, depending on the film thickness, should be less than 40 in the case of 100 µm films and less than 30 in the case of 50 µm films.

The good mechanical properties include a high modulus of elasticity ($E_{MD}$>3200 N/mm$^2$; $E_{TD}$>4100 N/mm$^2$) and good breaking strength values (in MD>120 N/mm$^2$; in TD>170 N/mm$^2$) and good values for elongation at break in longitudinal direction and in transverse direction (in MD>120%; in TD>50%).

One aspect of good stretchability is that the film can be stretch-oriented during the production thereof in an outstanding manner and without breakoffs both in longitudinal direction and in transverse direction.

In addition, the inventive film should be recyclable, which means that offcut material which occurs in the course of operation during film production can be recycled back into the production operation as regrind, more particularly without loss of the optical and mechanical properties of the film, in order that it can also be used for interior applications and in exhibition construction, for example.

DETAILED DESCRIPTION OF ADVANTAGEOUS EMBODIMENTS OF THE INVENTION

Figure 1:
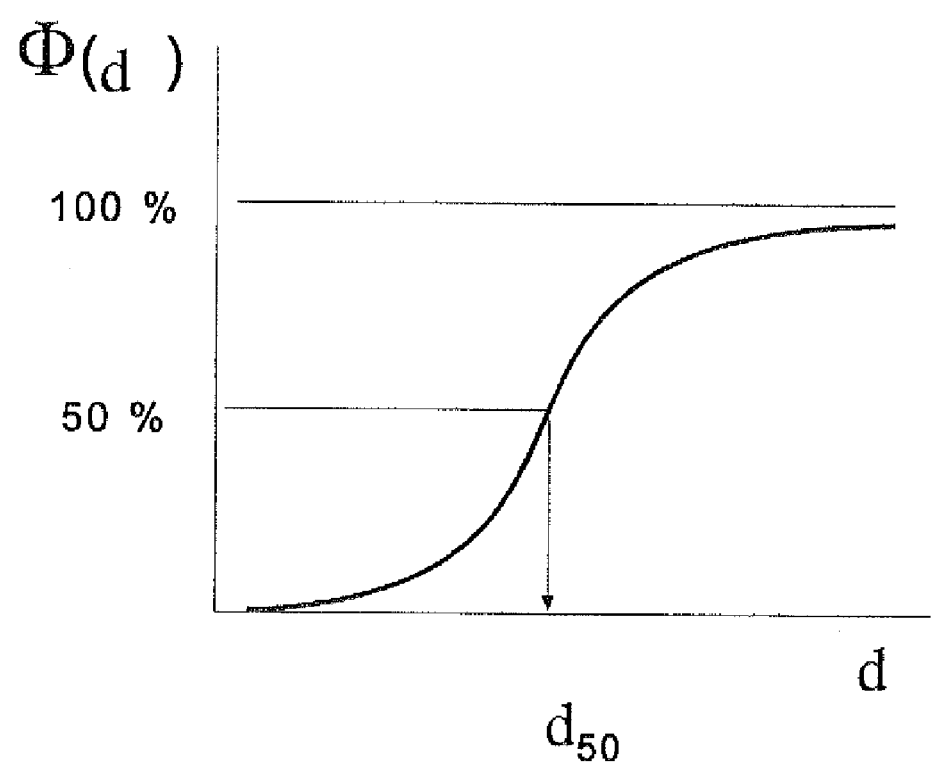
FIG. 1 is a graphical illustration of an exemplary cumulative curve of the particle size distribution.

This object is achieved by a hazy polyester film which has a thickness in the range from 10 to 100 µm, and comprises a thermoplastic polyester as the main constituent. The film comprises barium sulfate with a mean particle size in the range from 0.1 to 0.5 µm, expressed as $d_{50}$, as a pigment, and additionally optionally a UV stabilizer as a light stabilizer.

The film according to the invention comprises a thermoplastic polyester as the main constituent. Suitable thermoplastic polyesters are, for example, polyethylene terephthalate, polybutylene terephthalate or polyethylene naphthalate, preference being given to polyethylene terephthalate.

The film according to the invention may have either one layer or more than one layer, and it may be coated with various copolyesters or with adhesion promoters.

The film according to the invention may optionally comprise a UV stabilizer as a light stabilizer, which is appropriately metered in directly in the course of film production by means of so-called masterbatch technology, the amount of UV stabilizer preferably being in the range between 0 and 5% by weight, based on the weight of the crystallizable thermoplastic.

The film comprises barium sulfate as a pigment, the amount of pigment being in the range between 5.0 and 25% by weight, preferably in the range between 10.0 and 25.0% by weight and more preferably in the range from 15 to 20% by weight, based on the total weight of crystallizable thermoplastic plus pigment. The barium sulfate is preferably metered into the thermoplastic in the course of film production by means of so-called masterbatch technology.

The film may additionally also comprise an optical brightener, the optical brightener being used in amounts in the range from 10 to 50 000 ppm, especially from 20 to 30 000 ppm, more preferably from 50 to 25 000 ppm, based on the weight of the crystallizable thermoplastic. The optical brightener is preferably also metered into the thermoplastic in the course of film production by means of so-called masterbatch technology. Optical brighteners suitable in accordance with the invention are those compounds which are capable of absorbing invisible UV rays in the range from 360 to 380 nm and of releasing them as longer-wave, visible blue-violet light.

Suitable optical brighteners in this context are bisbenzoxazoles, phenylcoumarins and bissterylbiphenyls, especially phenylcoumarin, particular preference being given to triazinephenylcoumarins obtainable under the product name TINOPAL® from Ciba-Geigy, Basel, Switzerland, or HOSTALUX® KS (Clariant, Germany) and EASTOBRITE® OB-1 (Eastman).

If appropriate, soluble blue dyes can also be added to polyesters as well as the optical brightener. Suitable blue dyes have been found to be cobalt blue, ultramarine blue and anthraquinone dyes, especially SUDAN BLUE® 2 (BASF, Ludwigshafen, Federal Republic of Germany).

The blue dyes are used in amounts of 10 to 10 000 ppm, especially 20 to 5000 ppm, more preferably 50 to 1000 ppm, based on the weight of the crystallizable thermoplastic.

The hydrolysis stabilizers used are generally phenolic stabilizers, alkali metal/alkaline earth metal stearates and/or alkali metal/alkaline earth metal carbonates in amounts of 0.01 to 1.0% by weight. Phenolic stabilizers are preferred in an amount of 0.05 to 0.6% by weight, especially 0.15 to 0.3% by weight, and with a molar mass of more than 500 g/mol. The compounds pentaerythrityl tetrakis-3-(3,5-di-tert-butyl-4-hydroxyphenyl)propionate or 1,3,5-trimethyl-2,4,6-tris(3,5-di-tert-butyl-4-hydroxybenzyl)benzene are particularly advantageous.

It was completely surprising that the use of barium sulfate with a particle size in the range from 0.1 to 0.5 µm, expressed as $d_{50}$, led to the desired good profile of optical properties combined with good mechanical properties.

In addition, it is very surprising that the film offcut material is also reusable for the film production as regrind, without adversely affecting the yellowness index of the film.

In a preferred embodiment, precipitated barium sulfate types are used. Precipitated barium sulfate is obtained from barium salts and sulfates or sulfuric acid as a finely divided colorless powder whose particle size is to be controlled through the precipitation conditions. Precipitated barium sulfates can be prepared by the customary methods described in Kunststoff-Journal 8, no. 10, 30-36 and no. 11, 36-31 (1974).

The mean particle size of the barium sulfate is relatively small and is preferably in the range from 0.1 to 0.5 µm, preferably in the range from 0.15 to 0.45 µm and more preferably in the range from 0.20 to 0.40 µm. The measurement of these particle sizes in the cryptocrystalline range as a $d_{50}$ value is carried out by means of a laser; the exact test method is described within the explanations of the working examples. The density of the barium sulfate used is between 3 and 6 g/cm$^3$.

In a particularly preferred embodiment, the inventive film comprises a crystallizable polyethylene terephthalate as the main constituent, and 5 to 25% by weight of precipitated barium sulfate, appropriately with a particle size from 0.25 to 0.35 µm, particular preference being given to ®Blanc Fixe $d_{50}$=0.30 µm (±0.05 µm) from Sachtleben Chemie, Germany.

In addition, the inventive film comprises, as a UV stabilizer, 0.01 to 5.0% by weight of 2-(4,6-diphenyl-1,3,5-triazin-2-yl)-5-(hexyl)oxyphenol of the formula:

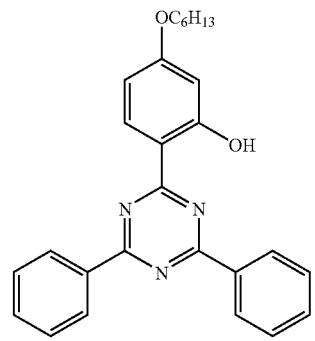

or alternatively 0.1 to 5.0% by weight of 2,2'-methylenebis (6-(2H-benzotriazol-2-yl)-4-(1,1,2,2-tetramethylpropyl) phenol) of the formula:

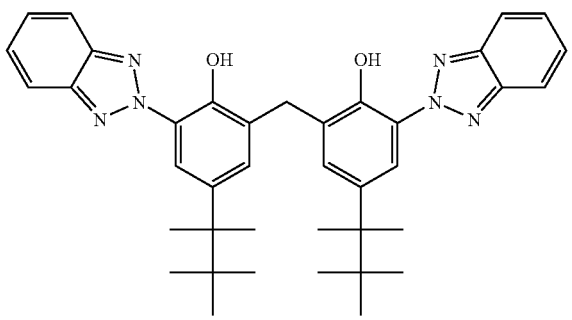

based in each case on the weight of the thermoplastic.

In a further embodiment, it is also possible to use mixtures of the UV stabilizers mentioned or mixtures of at least one of the preferred UV stabilizers with other UV stabilizers, the total amount of light stabilizer preferably being between 0.01% by weight and 5.0% by weight, based on the total weight of the thermoplastic plus additives.

In a further embodiment of the invention, it is possible to use a further UV stabilizer which has the following structural formula (I):

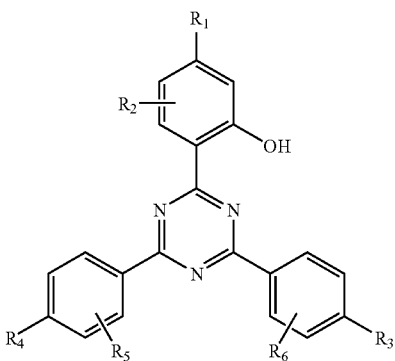

(I)

where
$R_1$ is —H, —$C_1$-$C_{12}$-alkyl, -aryl, —S—($C_1$-$C_{12}$)-alkyl or —O—$R_9$ or —O—($C_1$-$C_5$)-alkylene-C(O)O—$R_9$, where $R_9$ is -aryl or —$C_1$-$C_{12}$-alkyl,
$R_3$ and $R_4$ are each

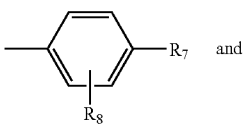 and $R_2$, $R_5$, $R_6$, $R_7$ and $R_8$ are each independently —H, —($C_1$-$C_{12}$)-alkyl, —O—($C_1$-$C_{12}$)-alkyl, -aryl or —O-aryl,
where said alkyl radicals having more than two carbon atoms and the alkylene radicals having more than one carbon atom may be linear or branched.

Preference is given to compounds of the formula (I) in which
$R_1$ is —O—$R_9$ or —O—CH($CH_3$)—C(O)O—$R_9$ where $R_9$ is hexyl, heptyl or octyl and
$R_2$, $R_5$, $R_6$, $R_7$ and $R_8$ are each —H.

Particular preference is given to 2-(2-hydroxy-4-[1-octyloxycarbonylethoxy]phenyl)-4,6-bis(4-phenylphenyl)-1,3,5-triazine, which is supplied as TINUVIN® 479 by Ciba SC (Switzerland).

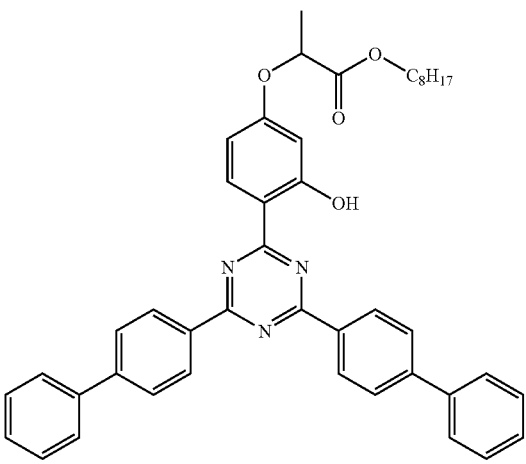

The surface gloss of the inventive hazy film, measured to DIN 67530 (measurement angle 20°), is less than 30, preferably less than 25 and more preferably less than 20.

The transparency of the inventive hazy film, measured to ASTM-D 1003, is greater than 56%, preferably greater than 60%, more preferably greater than 64%. The coloring is homogeneous and streak-free over the entire running length and film width.

The standard viscosity SV (DCA) of the polyethylene terephthalate, measured in dichloroacetic acid to DIN 53728 at 25° C., is in the range between 600 and 1000, preferably between 650 and 900.

The intrinsic viscosity (IV) is calculated from the standard viscosity as follows $$IV[\eta]=6.907 \cdot 10^{-4} \, SV \, (DCA)+0.063096 \, [dl/g].$$

The hazy polyethylene terephthalate film, which comprises at least barium sulfate in an amount of 5 to 25% by weight with a mean particle size in the range from 0.1 to 0.5 µm, and may comprise an optical brightener, a UV stabilizer and optionally blue dyes, may either have one layer or a plurality of layers. Addition of small amounts of other white pigments, for example titanium dioxide, can likewise achieve good optical and mechanical properties. In the preferred form, the polyester film, apart from barium sulfate, does not, however, contain any further white pigments.

In the multilayer embodiment, the film is formed from at least one core layer and at least one top layer, preference being given especially to a three-layer structure of A-B-A or A-B-C type.

For the multilayer embodiment, it is essential that the polyethylene terephthalate of the core layer possesses a similar standard viscosity to the polyethylene terephthalate of the top layer(s) which adjoin(s) the core layer.

In a particular embodiment, the top layers may also consist of a polyethylene naphthalate homopolymer or of a polyethylene terephthalate-polyethylene naphthalate copolymer or a compound. In this particular embodiment, the thermoplastics of the top layers likewise have a similar standard viscosity to the polyethylene terephthalate of the core layer.

Unlike in the one-layer embodiment, the stated amount of the additives in the multilayer embodiment is based on the weight of the thermoplastics in the particular layer modified with the additive(s).

In the course of production of the film, it has been found that the film can be oriented in an outstanding manner in longitudinal direction and in transverse direction without breakoffs.

Furthermore, the inventive film is recyclable without any problem, without environmental pollution and without loss of the mechanical properties.

The inventive film can be produced, for example, by an extrusion process in an extrusion line.

According to the invention, the barium sulfate and the UV stabilizer, and if appropriate also the optical brightener and the blue dye, can be incorporated directly at the thermoplastic raw material manufacturer, or the additives can be metered into the thermoplastic by means of masterbatch technology in the course of film production in the extruder. Preference is given to metered addition of the barium sulfate and of the UV stabilizer, of the optical brightener and of the blue dye by means of masterbatch technology. This disperses the additives fully in a solid carrier material. Useful carrier materials include the thermoplastic itself, for example the polyethylene terephthalate, or else other polymers which are sufficiently compatible with the thermoplastic, or waxes.

The polyester films can be produced by known processes from a polyester raw material with optionally further raw materials and the optical brightener, the UV stabilizer, the flame retardant, the barium sulfate, if appropriate the blue dye and/or further customary additives in a customary amount of 0.1 to not more than 10% by weight, either as monofilms or as multilayer, optionally coextruded films with identical or different surfaces, for example one surface being pigmented and modified so as to be UV-stable and the other surface not containing any pigment and/or UV stabilizer. It is equally possible for one or both surfaces of the film to be provided with a customary functional coating by known processes.

In the preferred extrusion process for producing the polyester film, the polyester material which has been melted beforehand is extruded through a slot die and is quenched on a chill roll as a substantially amorphous preliminary film. This film is then reheated and stretched in longitudinal and transverse direction, or in transverse and in longitudinal direction, or in longitudinal, in transverse and once again in longitudinal and/or transverse direction. According to the invention, the stretching temperatures are $T_g+10$ K to $T_g+60$ K (where $T_g$=glass transition temperature), the stretching ratio of longitudinal stretching is, according to the invention, within the range from 2 to 6, especially from 2.5 to 4.5, that of the transverse stretching within the range from 2 to 5, especially from 3 to 4.5, and that of any second longitudinal stretching conducted from 1.1 to 3. The first longitudinal stretching can optionally be performed simultaneously with the transverse stretching (simultaneous stretching). This is followed by the heatsetting of the film at oven temperatures in the range from 200 to 260° C., especially from 220 to 250° C., over a period of 0.5 to 10 s. Thereafter, the film is cooled and wound up.

The surprising combination of excellent properties, specifically high transparency in conjunction with good scattering action (volume scatter), make the inventive film outstandingly suitable for internal and external window glazing, for interior paneling, especially in bright rooms, for exhibition construction and for exhibition articles, in vehicles and buildings, in the lighting sector and in shopfitting and shelving.

The table which follows summarizes a number of advantageous features of the inventive film and their preferred ranges once again.

Transparency and Haze

The transparency and haze are measured to ASTM D 1003-00 on a film with a thickness of 50 μm with the HAZE-GARD® Hazemeter XL-211 measuring instrument from BYK Gardner.

The transparency is understood to mean the ratio of the total amount of light transmitted to the amount of incident light.

Surface Defects, Homogeneous Coloring

Surface defects and homogeneous coloring are determined visually.

Mechanical Properties

The modulus of elasticity, the breaking strength and the elongation at break are measured in longitudinal and transverse direction to ISO 527-1-2.

SV (DCA), IV (DCA)

The standard viscosity SV (DCA), based on DIN 53726, is measured in dichloroacetic acid at a temperature of 25° C.

The intrinsic viscosity (IV) is calculated as follows from the standard viscosity $$IV[\eta]=6.907\cdot10^{-4}\,SV\,(DCA)+0.063096\,[dl/g]$$

Yellowness Index

The yellowness index YID is the deviation from colorlessness in the "yellow" direction and is measured to DIN 6167.

Measurement of the Mean Diameter $d_{50}$

The determination of the mean diameter $d_{50}$ is performed by means of a laser on a Malvern MASTER SIZER® by the standard method (other measuring instruments are, for example, Horiba LA® 500 or Sympathec HELOS®, which use the same measurement principle). To this end, the samples are placed into a cuvette containing water, which is then placed into the measuring instrument. The measuring operation is automatic and also includes the mathematical determination of the $d_{50}$.

By definition, the $d_{50}$ is determined from the (relative) cumulative curve of the particle size distribution: the point of intersection of the 50% ordinate value with the cumulative curve immediately provides the desired $d_{50}$ on the abscissa axis. A exemplary particle size distribution cumulative curve is illustrated in FIG. 1.

TABLE 1

|  | preferred | more preferred | most preferred | Unit | Test method |
| --- | --- | --- | --- | --- | --- |
| Film thickness | 10 to 100 | 12 to 75 | 23 to 65 | μm | — |
| Concentration of barium sulfate (white pigment) | 5.0 to 25.0 | 10.0 to 25.0 | 15.0 to 25.0 | % by wt. | in-house |
| Mean particle size ($d_{50}$) of the barium sulfate | 0.1 to 0.5 | 0.15 to 0.45 | 0.20 to 0.40 | μm | Laser method (see description) |
| Transparency of the film | >56 | >60 | >64 | % | ASTM-D 1003-00 |
| Haze | 40-95 | 45-90 | 50-85 | % | ASTM-D 1003-00 |
| Gloss of 1st and 2nd film side (in each case angle of incidence = 20°) | <30 | <25 | <20 |  | DIN 67530 |
| Yellowness index for film <50 μm | <30 | <25 | <20 |  | DIN 6167 |
| Yellowness index for film <100 μm | <40 | <35 | <30 |  | DIN 6167 |

According to the application, the individual properties of the inventive film are measured by the following standards or methods.

Test Methods

Surface Gloss

The surface gloss is measured to DIN 67530. Based on the standards ASTM-D 523 78 and ISO 2813, the angle of incidence is set at 20°.

Measurement of UV Stability

All films are weathered according to the test specification ISO 4892 on both sides for 1000 hours per side with the Atlas CI® 65 Weather-Ometer from Atlas, and then tested with regard to the mechanical properties, the discoloration, the surface defects, the transparency and the gloss.

Measurement of Flame Retardancy

Fire tests to DIN 4102, part 2 and part 1, and UL Test 94 are carried out on all films.

Masterbatch 1 (MB1)

Extrusion masterbatch with 24% by weight of $BaSO_4$ ($BaSO_4$=Blanc Fixe®, mean particle size $d_{50}$=0.30 μm from Sachtleben, Germany, and 300 ppm of HOSTALUX® KS from Clariant, Germany) in polyethylene terephthalate (PET). The barium sulfate and the HOSTALUX® KS were metered together with the polyester raw material T94 from Invista, Germany, into the intake zone of a Werner and Pfleiderer (Germany) twin-screw extruder, extruded and pelletized.

Masterbatch 2 (MB2)

Extrusion masterbatch with 20% by weight of Tinuvin® 1577 UV stabilizer, Ciba-Geigy, Switzerland, and 40 ppm of SUDAN BLUE® 2 blue dye, BASF, Germany, in polyethylene terephthalate. The components were metered together with the polyester raw material T94 from Invista, Germany, into the intake zone of a Werner and Pfleiderer twin-screw extruder, extruded and pelletized.

Masterbatch 3 (MB3)

Extrusion masterbatch with 10% by weight of $SiO_2$ (Silysia® 320, mean particle size $d_{50}$=2.5 μm, from Fuji Sylysia, Japan) in polyethylene terephthalate (PET). The silicon dioxide was metered together with the polyester raw material T94 from Invista, Germany, into the intake zone of a Werner and Pfleiderer twin-screw extruder, extruded and pelletized.

Raw Material (R1)

100% by weight of RT49 polyethylene terephthalate from Invista, Germany.

The film properties for the examples which follow are listed individually in Table 2 after the description of the examples.

Example 1

A 50 μm-thick, biaxially oriented, hazy film was produced, which contains, as the main constituent, polyethylene terephthalate (RT49, Invista, Germany) as a clear raw material, 18% by weight of barium sulfate (BLANC FIXE® $d_{50}$=0.3 μm, Sachtleben Chemie, Germany) as a pigment.

The barium sulfate additive was added as a masterbatch. The polyethylene terephthalate from which the film was produced and the polyethylene terephthalate which was used to produce the masterbatch had a standard viscosity SV (DCA) of 810, which corresponds to an intrinsic viscosity of 0.658 dl/g.

Before the extrusion, 75% by weight of masterbatch (1) and 25% by weight of raw material R1 were dried at a temperature of 150° C. and then melted in the extruder. The molten extrudate was extruded through a slot die and quenched on a chill roll to give an amorphous preliminary film. The preliminary film was then first stretched longitudinally at 87° C. by a factor of 3.5 and thereafter stretched transversely at 105° C. by 3.5. This was followed by the heatsetting of the film at 240° C. over a period of 2 s. Finally, the film was cooled and wound up.

Example 2

The formulation from example 1 was modified. Before the extrusion, 75% by weight of MB1 and 25% by weight of MB2 were dried at a temperature of 150° C. and then melted in the extruder. All other parameters were maintained.

Example 3

The formulation from example 1 was modified. 100% by weight of MB1 was used.

Example 4

The film from example 1 was run as an ABA film. The formulation of the base is identical to the formulation of example 2. The process parameters were set correspondingly to example 1.

The film was accordingly run with the following formulation:

Base B: 42 μm; formulation as example 1
Top layers A: each 4 μm; 75% by weight of MB1, 10% by weight of raw material R1 and 15% by weight of MB3

Example 5

Comparative Example

A 50 m-thick, white opaque film was produced to EP 1 125 966, which contained, as the main constituent, polyethylene terephthalate (RT49, Invista, Germany) as a clear raw material, 18% by weight of barium sulfate (Blanc fixe XR-HX, Sachtleben Chemie) as a pigment with a mean particle size of 0.6 μm (Data sheet from Sachtleben). For this purpose, the same process parameters as in example 1 were used.

TABLE 2

| Properties | Ex. 1 | Ex. 2 | Ex. 3 | Ex. 4 | Ex. 5 (= Comp.) |
|---|---|---|---|---|---|
| Thickness [μm] | 50 | 50 | 50 | 50 | 50 |
| SV | 732 | 683 | 656 | 676 | 722 |
| Surface gloss 1st side | 9 | 6 | 5 | 11 | 20 |
| (Measurement angle 20°) 2nd side | 10 | 6 | 5 | 12 | 21 |
| Transparency [%] | 70 | 71 | 65 | 71 | 19 |
| Haze [%] | 77 | 70 | 84 | 75 | 99 |
| Yellowness index (YID) | 10 | 15 | 10 | 10 | 18 |
| Longitudinal modulus of elasticity [N/mm$^2$] | 3800 | 3800 | 3800 | 3810 | 3600 |
| Transverse modulus of elasticity [N/mm$^2$] | 4300 | 4350 | 4200 | 4600 | 5100 |
| Longitudinal breaking strength [N/mm$^2$] | 160 | 160 | 145 | 155 | 145 |
| Transverse breaking strength [N/mm$^2$] | 190 | 190 | 190 | 195 | 240 |
| Longitudinal elongation at break [%] | 150 | 152 | 155 | 160 | 185 |
| Transverse elongation at break [%] | 100 | 100 | 75 | 91 | 70 |

The invention claimed is:

1. A hazy polyester film having a thickness in the range from 10 to 100 μm, comprising (i) a thermoplastic polyester as the main constituent, (ii) barium sulfate with a mean particle size in the range from 0.1 to 0.5 μm, expressed as $d_{50}$, and (iii) optionally further comprising a UV stabilizer as a light stabilizer,
   wherein said film has a haze, measured to ASTM-D 1003, in the range from 40 to 95%.

2. The polyester film as claimed in claim 1, said film comprising barium sulfate in an amount of 5 to 25% by weight, based on the total weight of the film.

3. The polyester film as claimed in claim 1, wherein said film exhibits a transparency, measured to ASTM-D 1003, of greater than 56%.

4. The polyester film as claimed in claim 1, wherein said film comprises polyethylene terephthalate, polybutylene terephthalate or polyethylene naphthalate as the thermoplastic polyester.

5. The polyester film as claimed in claim 1, wherein said film has a haze, measured to ASTM-D 1003, in the range from 45 to 95%.

6. The polyester film as claimed in claim 1, wherein said film comprises barium sulfate in an amount in the range between 10.0 and 25.0% by weight, based on the total weight of thermoplastic polyester plus pigment.

7. The polyester film as claimed in claim 1, wherein the barium sulfate has a mean particle size in the range from 0.15 to 0.45 µm.

8. The polyester film as claimed in claim 1, wherein said film comprises UV stabilizer in an amount of 0.01 to 5.0% by weight of 2-(4,6-diphenyl-1,3,5-triazin-2-yl)-5-(hexyl)oxyphenol or an amount of 0.1 to 5.0% by weight of 2,2'-methylenebis(6-(2H-benzotriazol-2-yl)-4-(1,1,2,2-tetramethylpropyl)phenol), based in each case on the weight of the thermoplastic polyester.

9. The polyester film as claimed in claim 1, wherein said film comprises UV stabilizer in an amount of 0.1 to 7% by weight of 2-(2-hydroxy-4-[1-octyloxycarbonylethoxy]phenyl)-4,6-bis(4-phenylphenyl)-1,3,5-triazine, based on the weight of the thermoplastic polyester.

10. The polyester film as claimed in claim 1, wherein said film possesses a multilayer structure composed of at least one core layer and at least one top layer.

11. The polyester film as claimed in claim 10, wherein said film has a three-layer structure of A-B-A or A-B-C type where B is a core layer and A and C are top layers.

12. The polyester film as claimed in claim 10, wherein said film comprises polyethylene terephthalate in the core and top layers and the polyethylene terephthalate of the core layer possesses a similar standard viscosity to the polyethylene terephthalate of the top layer(s) which adjoin(s) the core layer.

13. A process for producing a polyester film as claimed in claim 1 by the extrusion process, melting the polyester material and extruding the melted polyester through a slot die and quenching the extruded polyester on a chill roll as a substantially amorphous preliminary film, reheating the amorphous preliminary film and stretching the reheated film in longitudinal and transverse direction, or in transverse and in longitudinal direction, or in longitudinal, in transverse and once again in longitudinal and/or transverse direction, the stretching temperatures being established within the range from $T_g+10$ K to $T_g+60$ K, where $T_g$=glass transition temperature of the crystallizable thermoplastic, wherein the stretching ratio of longitudinal stretching is set within the range from 2 to 6 and the transverse stretching ratio is within the range from 2 to 5 and any second longitudinal stretching is conducted from 1.1 to 3, and heatsetting the stretched film at an oven temperature in the range from 200 to 260° C. over a period of 0.5 to 10 s.

14. Internal or external window glazing, interior paneling, exhibition construction material or articles, vehicle film, building film, lighting film, shopfitting film or shelving comprising film as claimed in claim 1.

15. The polyester film as claimed in claim 3, wherein said film exhibits a transparency, measured to ASTM-D 1003, of greater than 64%.

16. The polyester film as claimed in claim 3, wherein said film exhibits a transparency, measured to ASTM-D 1003, of greater than 56%.

17. The polyester film as claimed in claim 4, wherein said film comprises polyethylene terephthalate.

18. The polyester film as claimed in claim 5, wherein said film has a haze, measured to ASTM-D 1003, in the range from 45 to 90%.

19. The polyester film as claimed in claim 5, wherein said film has a haze, measured to ASTM-D 1003, in the range from 50 to 85%.

20. The polyester film as claimed in claim 6, wherein said film comprises barium sulfate in an amount in the range from 15 to 20% by weight, based on the total weight of thermoplastic polyester plus pigment.

21. The polyester film as claimed in claim 7, wherein the barium sulfate has a mean particle size in the range from 0.20 to 0.40 µm.

22. A process for producing a polyester film as claimed in claim 13 wherein the stretching ratio of longitudinal stretching is set within the range from 2.5 to 4.5 and the transverse stretching within the range from 3 to 4.5 and the heatsetting of the film is effected at oven temperatures in the range from 220 to 250° C.

23. The polyester film as claimed in claim 1, wherein said film comprises barium sulfate in an amount of 5 to 25% by weight, based on the total weight of the film, said film exhibiting a transparency, measured to ASTM-D 1003, of greater than 56%, a haze, measured to ASTM-D 1003, in the range from 40 to 95%, and a modulus of elasticity of greater than 3200 N/mm$^2$ in the machine direction, measured to ISO 527-1-2.

* * * * *